(12) United States Patent
Chou et al.

(10) Patent No.: US 8,306,282 B2
(45) Date of Patent: Nov. 6, 2012

(54) HIERARCHICAL FACE RECOGNITION TRAINING METHOD AND HIERARCHICAL FACE RECOGNITION METHOD THEREOF

(75) Inventors: Hong-Long Chou, Taipei (TW);
Tai-Chang Yang, Fongshan (TW);
Yin-Pin Chang, Taipei (TW)

(73) Assignee: Altek Corporation, Hsinchu (TW)

( * ) Notice: Subject to any disclaimer, the term of this patent is extended or adjusted under 35 U.S.C. 154(b) by 974 days.

(21) Appl. No.: 12/350,378

(22) Filed: Jan. 8, 2009

(65) Prior Publication Data

US 2010/0074479 A1 Mar. 25, 2010

(30) Foreign Application Priority Data

Sep. 19, 2008 (TW) .............................. 97136083 A (51) Int. Cl.
*G06K 9/00* (2006.01)
(52) U.S. Cl. ........................ 382/118; 382/159
(58) Field of Classification Search .................. 382/118, 382/159
See application file for complete search history.

(56) References Cited

U.S. PATENT DOCUMENTS

| 7,043,075 | B2* | 5/2006 | Gutta | 382/158 |
|---|---|---|---|---|
| 7,194,134 | B2* | 3/2007 | Bradshaw | 382/226 |
| 2002/0122596 | A1* | 9/2002 | Bradshaw | 382/226 |
| 2003/0002731 | A1* | 1/2003 | Wersing et al. | 382/161 |
| 2005/0185835 | A1* | 8/2005 | Matsugu et al. | 382/159 |

* cited by examiner

*Primary Examiner* — Hadi Akhavannik
(74) *Attorney, Agent, or Firm* — Rabin & Berdo, P.C.

(57) ABSTRACT

A hierarchical face recognition training method and a hierarchical face recognition method thereof for performing a face feature recognition on an image under detection. The method includes a training process and a recognition process. The recognition method includes the steps. A plurality of training samples is obtained. The training samples are subdivided into a plurality of sub-image categories according to a plurality of angle intervals, and the training of a plurality of face features performs on a corresponding sub-image detector of each of the sub-image categories. The training measures performed repeatedly to generate sub-image categories at a sub-level of the sub-image categories. The training method includes the steps. An image under detection is loaded. A similarity of each of sub-image detectors compares according to the image under detection, and the sub-image detector having the highest similarity is selected. The face recognition measures performed repeatedly on the selected sub-image detector.

15 Claims, 6 Drawing Sheets

HIERARCHICAL FACE RECOGNITION TRAINING METHOD AND HIERARCHICAL FACE RECOGNITION METHOD THEREOF

CROSS-REFERENCE TO RELATED APPLICATIONS

This non-provisional application claims priority under 35 U.S.C. §119(a) on Patent Application No(s). 097136083 filed in Taiwan, R.O.C. on Sep. 19, 2008 the entire contents of which are hereby incorporated by reference.

BACKGROUND OF THE INVENTION

1. Field of Invention

The present invention relates to a face recognition method, and more particularly to a hierarchical face recognition method performed according to facial angles in an image under detection.

2. Related Art

In recent years, human facial recognition systems have received great attention from research scholars and the industry, and computer devices (such as digital cameras and personal computers) have been deeply expected to have excellent performance on face recognitions of digital images. However, for a face recognition system of a computer device, different shooting angles result in wrong determinations of a face in an image under detection by the computer device.

A conventional face recognition flow may be divided into two parts, namely, training and recognition. In the training process of the conventional face recognition, a classification learning is performed on facial angles in all training samples one by one. For example, if the classification unit is 1 degree, the facial angles from 0 degree to 360 degrees are divided into 360 classification intervals. The computer device performs recognition training for each angle on all the training samples respectively.

The above problems not only appear in the process of the angle recognition training, but also appear in the recognition process of the facial angles. Still in the above example, since 1 degree is used as the classification interval in the training process, the facial angle recognition should also be performed 360 times on each of the recognition samples to find out the most appropriate result from 360 classification results. For example, in a learning of training/recognition performed on N classification intervals by M recognition samples, the complexity of the training/recognition for each angle is (M*N), which results in the following problems. That is, a long training time is required, and a large amount of memory space needs to be consumed. In this way, a lot of time is spent on other unnecessary facial angle determinations in the facial recognition process, and a lot of memory space and time is wasted.

SUMMARY OF THE INVENTION

In view of the above problems, the present invention is mainly directed to a hierarchical training method for a face recognition, which uses a computer device to perform a face feature training of sub-image detectors at each level on a plurality of training samples.

In order to achieve the above objective, the present invention provides a hierarchical training method for a face recognition, which includes the following steps. The training samples are obtained. A training measure is performed, the training samples are subdivided into a plurality of sub-image categories according to a plurality of angle intervals, and the training of a plurality of face features is performed on a corresponding sub-image detector of each of the sub-image categories. The training measure is performed repeatedly on each of the sub-image categories, so as to generate sub-image categories at a sub-level of the sub-image categories until a subdivision condition is satisfied.

From another point of view, the present invention is directed to a hierarchical face recognition method performed on an image under detection by the use of sub-image detectors in the above training method, which uses a computer device to perform face feature recognition of each of the sub-image detectors on the image under detection.

In order to achieve the above objective, the present invention provides a hierarchical face recognition method performed on an image under detection by the use of sub-image detectors in the above training method, which includes the following steps. An image under detection is loaded. The face recognition measure is performed respectively on the image under detection by each of the sub-image detectors at the same level, so as to obtain a similarity of each of the sub-image detectors to the image under detection, and then to select the sub-image detector having the highest similarity from the sub-image detectors. The face recognition measure is performed repeatedly on the image under detection by the selected sub-image detector until the image under detection completes the sub-image detectors at the last level.

From another point of view, the present invention is directed to a hierarchical face recognition method for an image under detection, which uses a computer device to perform a face feature recognition of each of sub-image detectors on the image under detection.

In order to achieve the above objective, the present invention provides a hierarchical face recognition method for an image under detection, which includes the following steps. A plurality of training samples is obtained. A training measure is performed, the training samples are subdivided into a plurality of sub-image categories according to a plurality of angle intervals, and the training of a plurality of face features is performed on a corresponding sub-image detector of each of the sub-image categories. The training measure is performed repeatedly on each of the sub-image categories, so as to generate sub-image categories at a sub-level of the sub-image categories until a subdivision condition is satisfied. The image under detection is loaded. A face recognition measure is performed, a similarity of each of the sub-image detectors at the same level to the image under detection is compared according to the image under detection, and the sub-image detector having the highest similarity is selected from the same level. The face recognition measure is performed repeatedly on the image under detection by the selected sub-image detector until the image under detection completes the sub-image detectors at the last level.

In the present invention, recognition samples having similar facial angles are used as a classification basis for different sub-image categories. Sub-image categories respectively belonging to the sub-image categories are generated recursively for the sub-image categories, such that a constitutional relationship between the root image collection and the sub-image categories forms a tree structure. Then, corresponding facial angles in the image under detection and each of the sub-image categories are compared, such that the image under detection is classified as the sub-image category similar thereto. Then, the comparison procedure is performed repeatedly and recursively until the image under detection is classified as the sub-image category having a matching facial angle. In this way, the classification action needs not to be performed repeatedly for each angle.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention provides a hierarchical face recognition method for an image under detection, which uses an electronic device (such as a digital camera and a personal computer) having a microprocessor to perform a face recognition of each sub-image detector. The face recognition flow of the present invention may also be divided into two parts, namely, training and recognition. In the training part of the present invention, an image detector of a hierarchical architecture is generated, each image detector generates sub-image detectors at a sub-level according to different facial angle intervals, and a face recognition training is performed respectively on each image detector to generate a face feature of each of the sub-image detectors.

Figure 1:
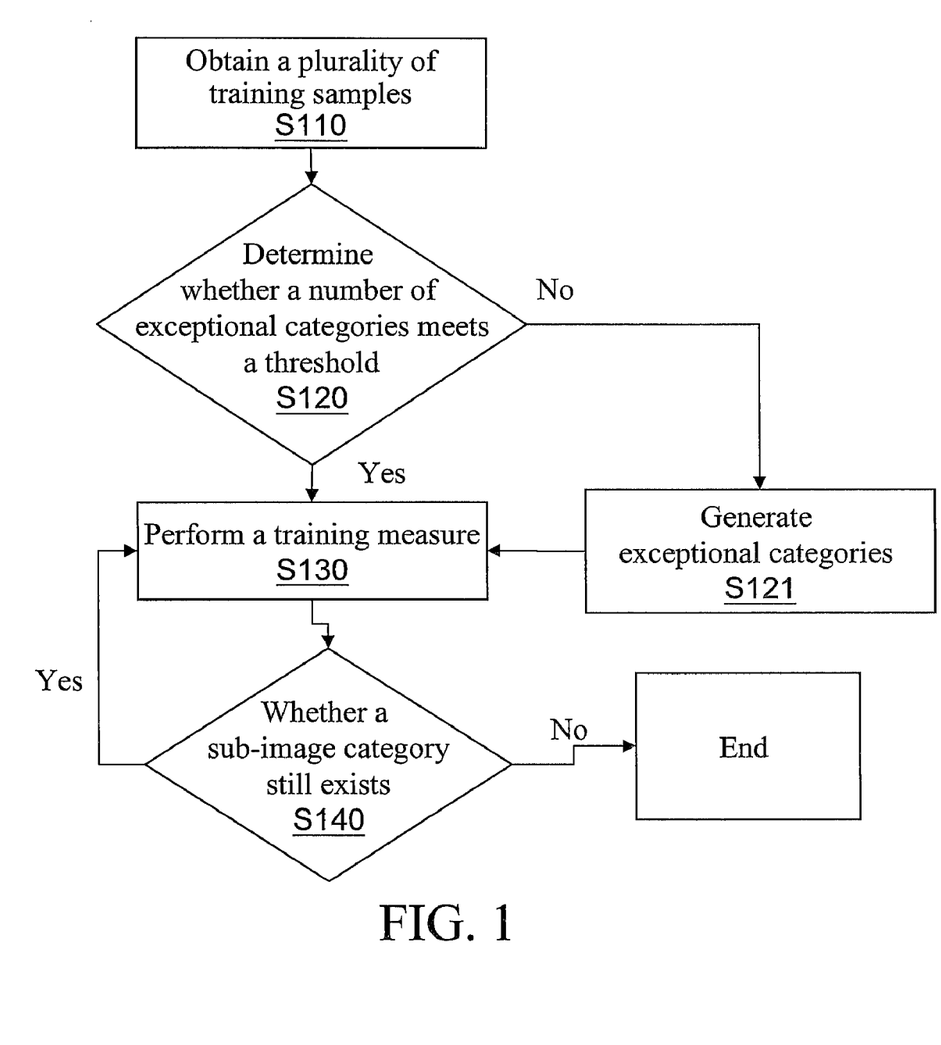
FIG. 1 is a flow chart illustrating an operation of a hierarchical training method for face recognition according to the present invention.

FIG. 1 is a flow chart illustrating an operation of a hierarchical training method for a face recognition according to the present invention. Referring to FIG. 1, the hierarchical training method for the face recognition includes the following steps. A plurality of training samples is obtained (Step S110). It is determined whether a number of exceptional categories of the training samples meets a threshold (Step S120). If the training samples do not include a face portion, the training samples are subdivided into exceptional categories (Step S121). After Step S121 is completed, Step S130 is performed.

If the number of the exceptional categories exceeds the threshold, a training measure is performed (Step S130). The training samples are subdivided into different sub-image categories according to a plurality of angle intervals, and the training of a plurality of face features is performed on a corresponding sub-image detector of each of the sub-image categories. Then, it is determined whether the training samples still have a sub-image category (Step S140). If a sub-image category on which the training measure is not performed still exists, Step S130 is repeated until all the sub-image categories are completed.

Figure 2A:
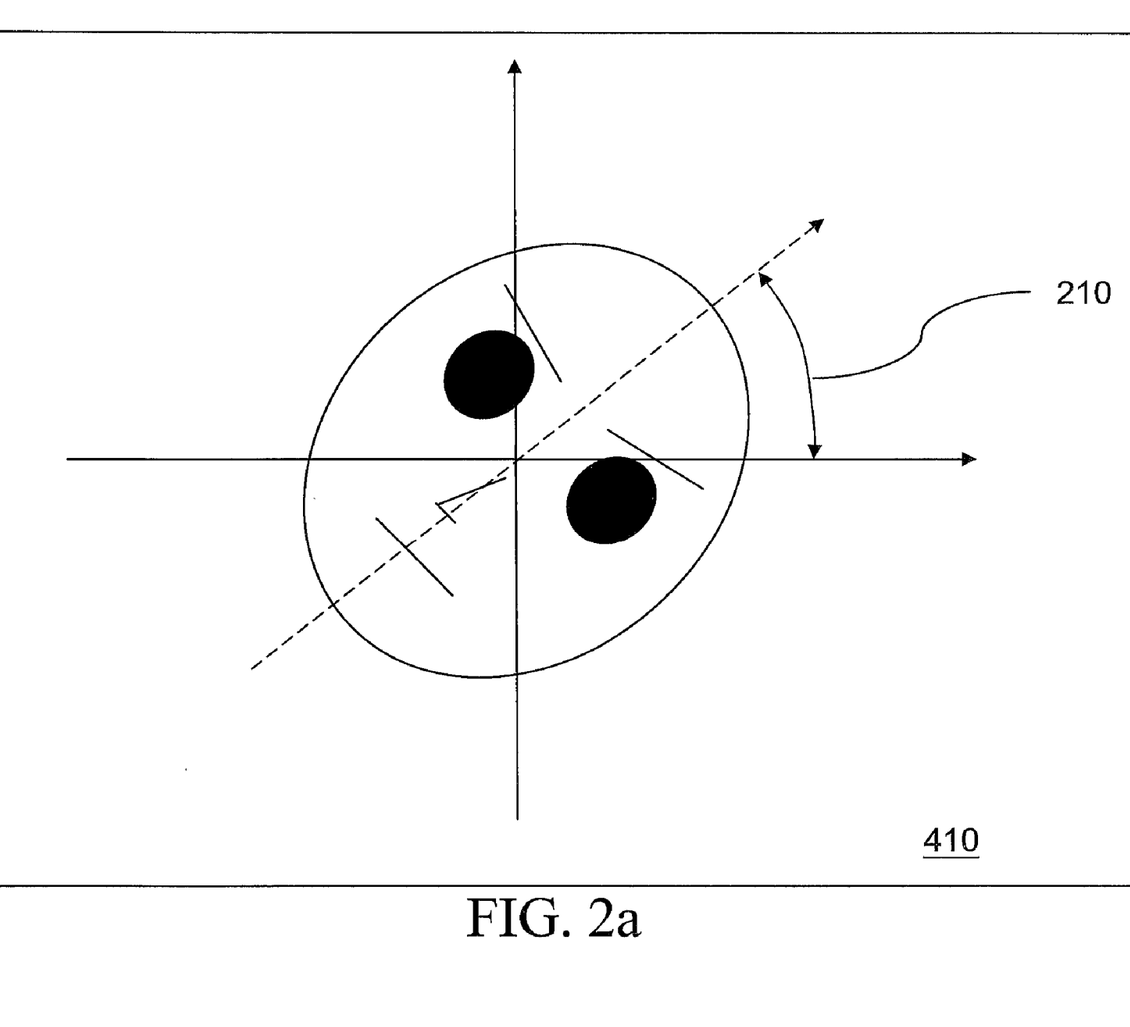
FIG. 2*a* is a schematic view of a rotation direction of a face.
Figure 2B:
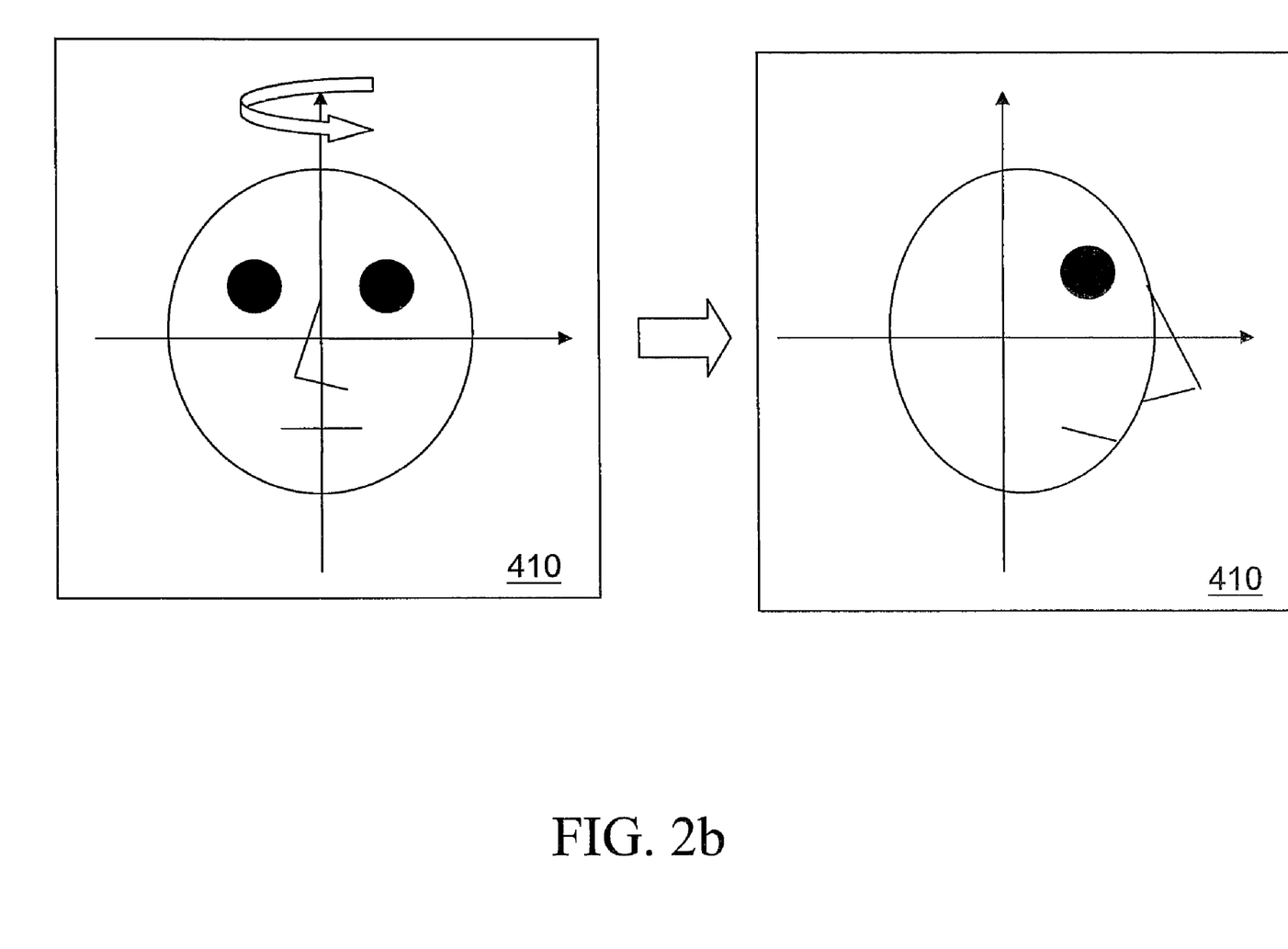
FIG. 2*b* is a schematic view of a head rotation direction of the face.

The angle interval refers to an angle interval of an included angle between a face in an image and a horizontal line. Referring to FIG. 2*a*, a schematic view of a rotation direction of the face is shown. Corresponding angle intervals are set for different face rotation angles. The face rotation angle in the present invention is an included angle between a major axis being a nose bridge and the horizontal line. In other implementation aspects, the facial angle may also be an included angle between the major axis and a vertical line. In addition, the face rotation angle may also be a head rotation angle of the face. Referring to FIG. 2*b*, a schematic view of a head rotation direction of the face is shown.

The sub-image detector is used to detect the face feature of the corresponding sub-image category. The entire face of the training sample is used as the face feature. Or, a relative position of at least one of an eyebrow, an ear, an eye, a nose, and a mouth may be selected from the face of the training sample as the face feature. A subdivision condition is determined by a number of generated levels of the sub-image categories or a number of the sub-image categories at each level.

Figure 3:
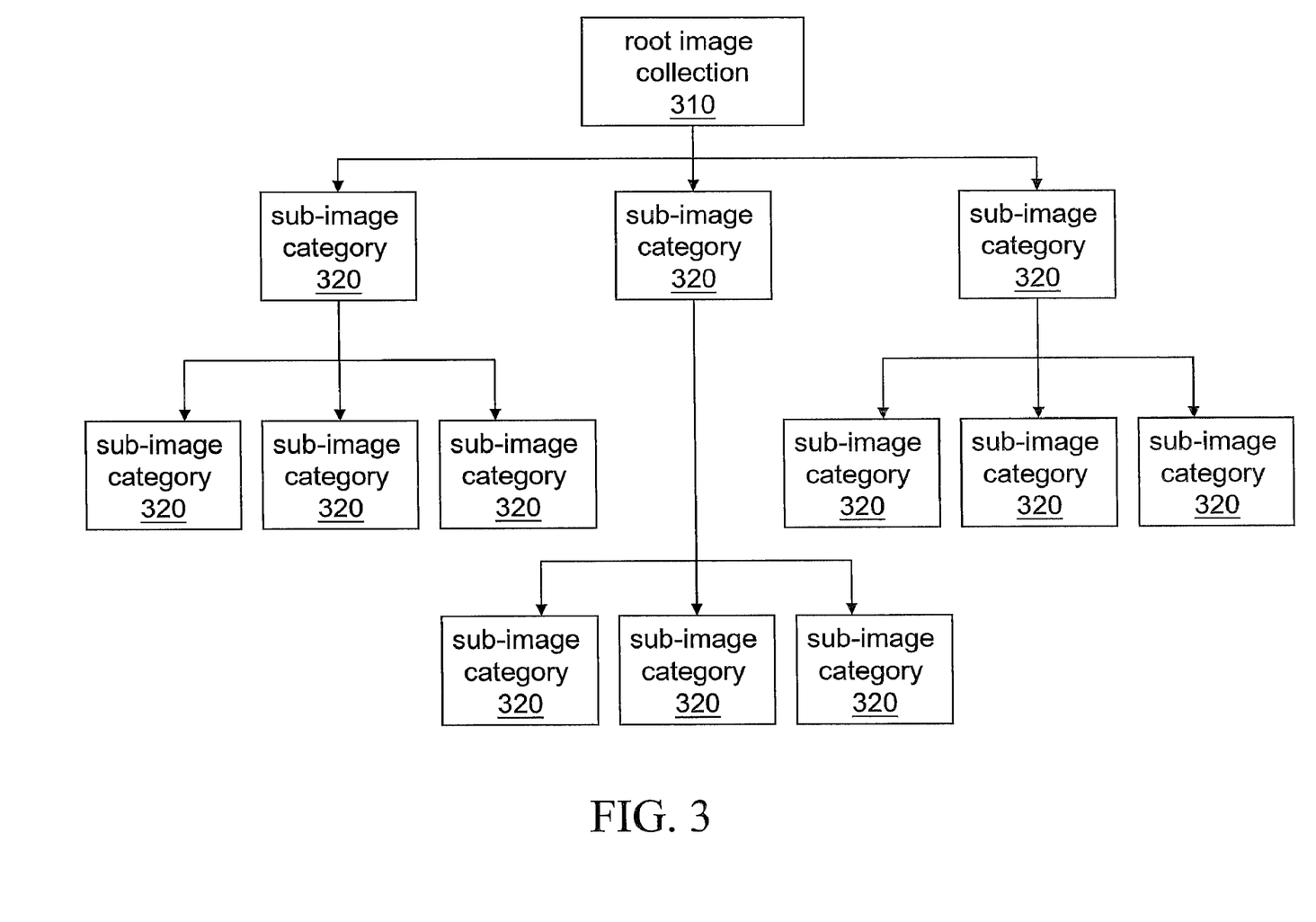
FIG. 3 is a schematic view of a hierarchical face recognition architecture according to the present invention.

After the training measure of all the sub-image categories is completed, the sub-image detectors having a hierarchical structure are generated. Referring to FIG. 3, a schematic view of a hierarchical face recognition architecture according to the present invention is shown. The uppermost part of FIG. 3 represents a collection of all training samples, which is called herein a root image collection 310. The root image collection 310 generates a corresponding number of sub-image categories 320 according to different numbers of angle intervals. The training samples conforming to the angle intervals are subdivided into the sub-image categories 320 to which the training samples belong. A face feature recognition training is performed on corresponding sub-image detectors (not shown) of the sub-image categories 320 according to the subdivided training samples. Then, the corresponding sub-image categories 320 are generated again for each of the generated sub-image categories 320.

Figure 4:
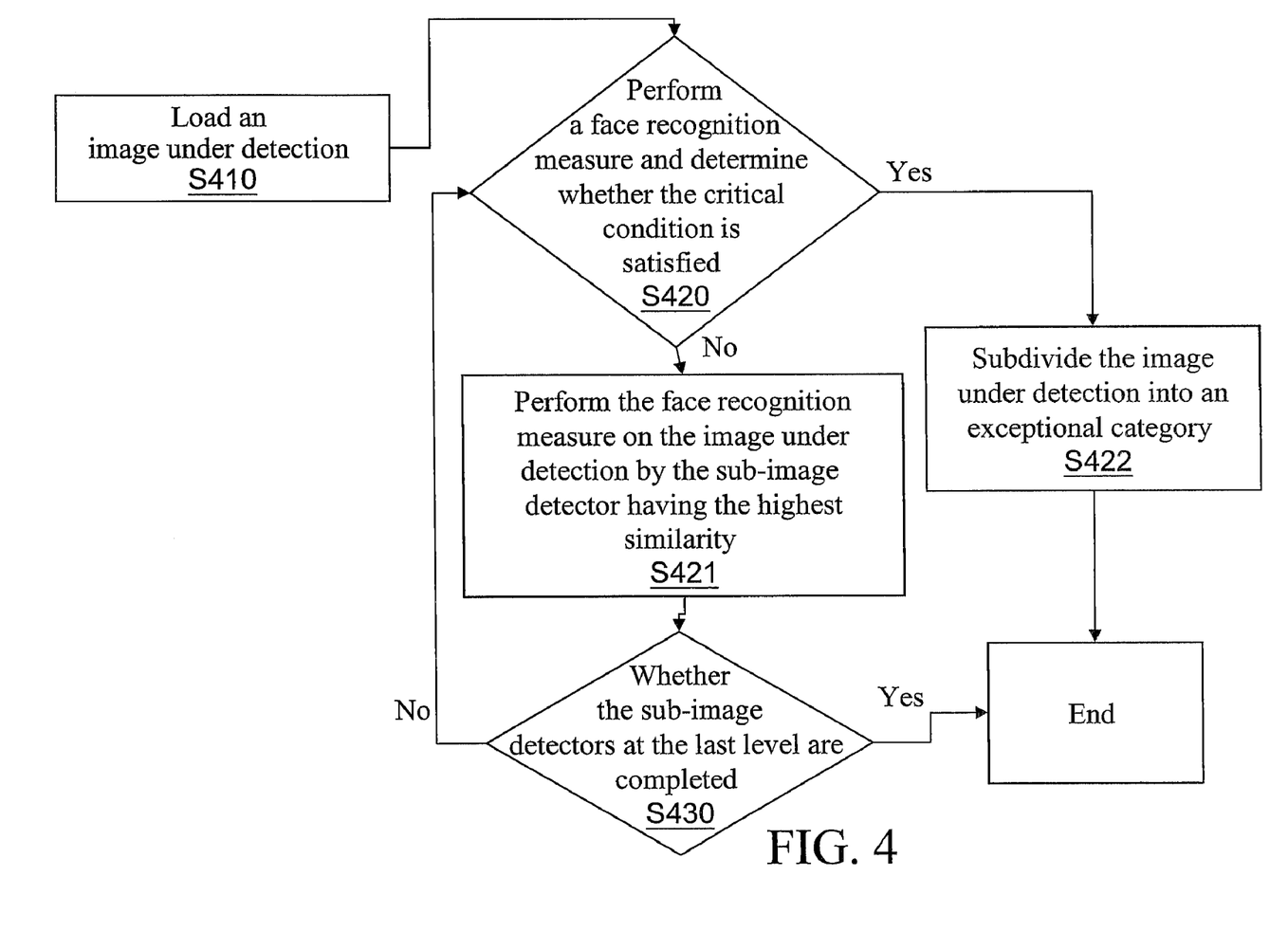
FIG. 4 is a flow chart illustrating an operation of a hierarchical face recognition method according to the present invention.

Upon completion of the hierarchical face recognition architecture, the hierarchical face recognition method of the present invention can be performed. Referring to FIG. 4, a flow chart illustrating an operation of the hierarchical face recognition method according to the present invention is shown. An image under detection is loaded (Step S410). A face recognition measure is performed (Step S420), so as to compare a similarity of each of sub-image detectors at the same level to the image under detection, and to select the sub-image detector having the highest similarity to the image under detection from the sub-image detectors at the same level. The sub-image detector selects at least one face feature as a basis for processing the similarity. If a processing result of the facial recognition measure does not satisfy a critical condition, the face recognition measure is performed on the image under detection by the sub-image detector having the highest similarity (Step S421). If the processing result of the facial recognition measure satisfies the critical condition, the image under detection is subdivided into an exceptional category (Step S422). The face recognition measure is performed repeatedly on the image under detection by the selected sub-image detector, until the image under detection completes the sub-image detectors at the last level (Step S430).

Figure 5:
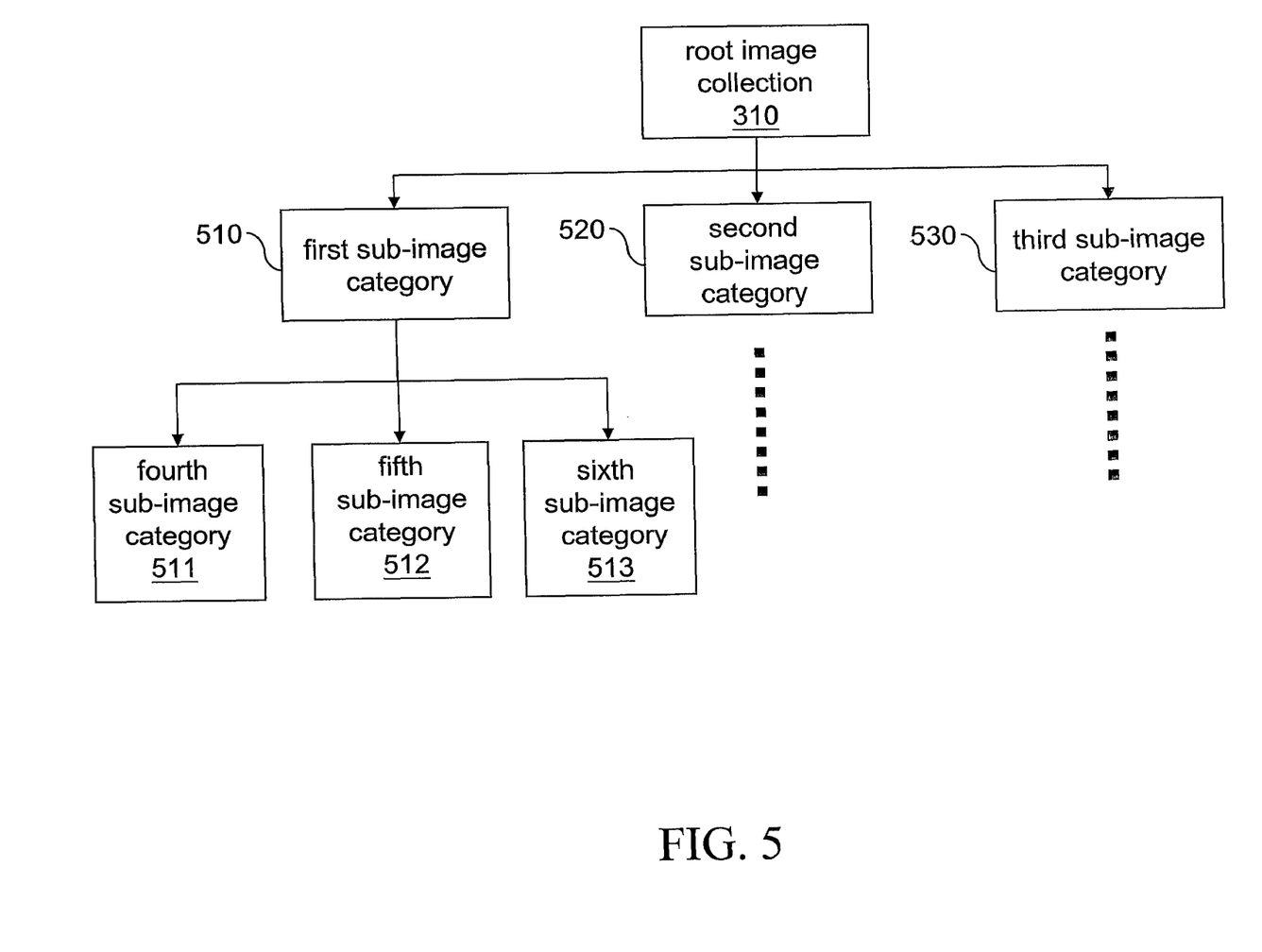
FIG. 5 is a schematic view of a hierarchy of this embodiment.

For sake of clear illustration, in this embodiment, a tree structure is used to explain the hierarchical training method for the face recognition and the face recognition method of the present invention. Referring to FIG. 5, a schematic view of a hierarchy of this embodiment is shown. Detection angles of the root image collection 310 range from 0 degree to 360 degrees. Taking a generation of three sub-image categories for example, the root image collection 310 is subdivided into the three sub-image categories according to three angle intervals. The three sub-image categories are respectively a first sub-image category 510, a second sub-image category 520, and a third sub-image category 530. The three sub-image categories are regarded as sub-image categories at the same level. The angle interval of the first sub-image category 510 is set as from 0 degree to 120 degrees, the angle interval of the second sub-image category 520 is set as from 121 degrees to 240 degrees, and the angle interval of the third sub-image category 530 is set as from 241 degrees to 360 degrees.

First, training samples having facial angles from 0 degree to 120 degrees are classified as the first sub-image category 510, and a face feature training of a sub-image detector of the first sub-image category 510 is performed according to the training samples. The training method of the face features may be, but not limited to, a support vector machine (SVM) method, an artificial neural network method, or a principal components analysis (PCA) method. Similarly, training samples having facial angles from 121 degrees to 240 degrees are classified as the second sub-image category 520, and a face feature training of a sub-image detector of the second sub-image category 520 is performed. Training samples having facial angles from 241 degrees to 360 degrees are classified as the third sub-image category 530, and a face feature training of a sub-image detector of the third sub-image category 530 is performed.

Next, Step S130 is performed again by taking the first sub-image category 510 for example. The first sub-image category 510 is subdivided into three sub-image categories, namely, a fourth sub-image category 511, a fifth sub-image category 512, and a sixth sub-image category 513. The angle interval of the fourth sub-image category 511 is set as from 0 degree to 40 degrees, the angle interval of the fifth sub-image category 512 is set as from 41 degrees to 80 degrees, and the angle interval of the sixth sub-image category 513 is set as from 81 degrees to 120 degrees. Training samples of the fourth sub-image category 511 are classified as the corresponding sub-image categories according to face angles. The face feature training of the sub-image detector of each of the sub-image categories is performed respectively on each of the sub-image categories. Step S130 is performed repeatedly on each of the sub-image categories until the subdivision condition is satisfied. In this way, all the training samples generate different sub-image detectors level by level, with a constitutional relationship like a tree structure.

Then, a face recognition is performed by the use of a result obtained by the hierarchical training method for the face recognition. First, a similarity calculation is performed on the image under detection and each of the sub-image categories of the root image collection. The similarity calculation of the image under detection is performed by the sub-image detectors at the same level according to face features. Particularly, when performing the similarity calculation, the sub-image detectors select part of the face features as a basis for the similarity processing. For example, if the sub-image detectors need to perform the training of 10 items of face features, the sub-image detectors select part of the items (or all of the items) from the 10 items to perform the similarity calculation.

It is assumed herein that the facial angle in the image under detection is 75 degrees, and the face feature similarity calculation is performed respectively by the sub-image detectors of the sub-image categories generated by the root image collection 310. The first sub-image category 510 has recognition samples having facial angles of the root image collection from 0 degree to 120 degrees. Since the facial angle in the image under detection is 75 degrees, a similarity of the sub-image detectors of the first sub-image category 510 is higher than that of other sub-image categories, and the first sub-image category 510 is selected as the sub-image category for the next recognition. Then, the face recognition measure is performed on the image under detection and all features of the first sub-image detector. If a processing result of the face recognition measure satisfies a critical condition, the image under detection is subdivided into an exceptional category. A setting of the critical condition is determined by a difference between the items of face features. If the processing result of the face recognition measure does not satisfy the critical condition, the similarity calculation of the sub-image categories at a sub-level to the image under detection is performed.

Similarly, a comparison of similarity is performed between the image under detection and the sub-image categories (respectively the fourth sub-image category 511, the fifth sub-image category 512, and the sixth sub-image category 513) generated by the first sub-image category 510. The sub-image category having the highest similarity to the image under detection is selected from the fourth sub-image category 511, the fifth sub-image category 512, and the sixth sub-image category 513. In this embodiment, the fifth sub-image category 512 has the highest similarity to the image under detection. Then, the face recognition measure is performed on the image under detection and all features of the fifth sub-image detector. Since the fifth sub-image category 512 is the sub-image category at the last level in this embodiment, it can be determined that the image under detection has the image of the face of 41 degrees to 80 degrees. If the face angle is to be found out more precisely, the sub-image categories having more levels may be set.

In the present invention, the sub-image categories at the sub-level are selected repeatedly and the similarity of the image under detection to the sub-image categories is compared level by level. Therefore, the comparison action needs not to be performed on all the sub-image detectors in the present invention. As long as the selected sub-image category is classified recursively, the classification of irrelevant detection angles may be avoided. The complexity of the present invention is log M*N, which is obviously reduced as compared with the complexity of (M*N) of the conventional classification.

In the present invention, recognition samples having similar facial angles are used as a classification basis for different sub-image categories. Sub-image categories belonging to each of the sub-image categories are generated recursively for each of the sub-image categories, such that a constitutional relationship between the root image collection and the sub-image categories forms a tree structure. Then, corresponding facial angles in the image under detection and each of the image collections are compared, such that the image under detection is classified as the image collection similar thereto. Then, the comparison procedure is performed repeatedly and recursively until the image under detection is classified as the sub-image category having a matching facial angle. In this way, whether the image under detection has a facial region can be calculated by the use of a small operation amount and a small memory capacity.

What is claimed is:

1. A hierarchical training method for face recognition, using a computer device to perform a face feature training of sub-image detectors at each level on a plurality of training samples, the method comprising:

obtaining the training samples;

performing a training measure by subdividing the training samples into a plurality of sub-image categories according to a plurality of angle intervals, and performing the face feature training on a corresponding sub-image detector of each of the sub-image categories; and performing the training measure for each of the sub-image categories, so as to generate sub-image categories at a lower level than a current level for said each sub-image categories, through which one of the plurality of angle intervals corresponding to said each sub-image category is subdivided into a plurality of angle intervals at the lower level, each angle interval at the lower level corresponding to one of the plurality of sub-image categories at the lower level, and repeating the training measure for each sub-image category at the rawer level until a subdivision condition is satisfied, wherein
the sub-image categories of all levels form a tree structure.

2. The hierarchical training method for face recognition according to claim 1, after obtaining the training samples, further comprising:
performing a face recognition to recognize whether the training samples comprise a face portion;
performing the training measure if the training sample comprises the face portion; and
subdividing the training sample into an exceptional category if the training sample does not comprise the face portion.

3. The hierarchical training method for face recognition according to claim 1, wherein an entire face of the training sample is used as a face feature.

4. The hierarchical training method for face recognition according to claim 1, wherein a relative position of at least one of an eyebrow, an ear, an eye, a nose, and a mouth is selected from the face of the training sample as a face feature.

5. The hierarchical training method for face recognition according to claim 1, wherein the subdivision condition is determined by a number of generated levels of the sub-image categories.

6. The hierarchical training method for face recognition according to claim 1, wherein the subdivision condition is determined by a number of the sub-image categories at each level.

7. A hierarchical face recognition method performed on an image under detection by use of the sub-image detectors according to claim 1, using a computer device to perform a face feature recognition of each of the sub-image detectors on the image under detection, the method comprising:
loading the image under detection;
respectively performing the face recognition measure on the image under detection by each of the sub-image detectors at a same level, so as to obtain a similarity of each of the sub-image detectors to the image under detection, and selecting the sub-image detector having a highest similarity, from the sub-image detectors; and
repeatedly performing the face recognition measure on the image under detection by the selected sub-image detector until the sub-image detectors at a last level finish performing the face recognition measure on the image under detection.

8. The hierarchical face recognition method performed on the image under detection by use of sub-image detectors according to claim 7, after obtaining the similarity, further comprising:
performing the face recognition measure on the image under detection by the sub-image detector having the highest similarity; and
subdividing the image under detection into an exceptional category if a processing result of the face recognition measure satisfies a critical condition.

9. The hierarchical face recognition method performed on the image under detection by use of sub-image detectors according to claim 7, wherein when performing the face recognition measure, the sub-image detector selects at least one face feature as a basis for processing the similarity.

10. A hierarchical face recognition method for an image under detection, using a computer device to perform a face feature recognition of each of sub-image detectors on the image under detection, the method comprising:
obtaining a plurality of training samples;
performing a training measure by subdividing the training samples into a plurality of sub-image categories according to a plurality of angle intervals, and performing a face feature training on a corresponding sub-image detector of each of the sub-image categories;
performing the training measure for each of the sub-image categories, so as to generate sub-image categories at a lower level than a current level for said each sub-image categories, through which one of the plurality of angle intervals corresponding to said each sub-image category is subdivided into a plurality of angle intervals at the lower level, each angle interval at the lower level corresponding to one of the plurality of sub-image categories at the lower level, and repeating the training measure for each sub-image category at the lower level until a subdivision condition is satisfied, wherein the sub-image categories of all levels form a tree structure;
loading the image under detection;
performing a face recognition measure by comparing a similarity of each of the sub-image detectors at a same level as the image under detection according to the image under detection, and selecting the sub-image detector having a highest similarity from the same level; and
repeatedly performing the face recognition measure on the image under detection by the selected sub-image detector until the sub-image detectors at a last level finish performing the face recognition measure on the image under detection.

11. The hierarchical face recognition method for the image under detection according to claim 10, after obtaining the training samples, further comprising:
performing a face recognition to recognize whether the training samples comprise a face portion;
performing the training measure if the training sample comprises the face portion; and
subdividing the training sample into an exceptional category if the training sample does not comprise the face portion.

12. The hierarchical face recognition method for the image under detection according to claim 10, wherein an entire face of the training sample is used as a face feature.

13. The hierarchical face recognition method for the image under detection according to claim 10, wherein a relative position of at least one of an eyebrow, an ear, an eye, a nose, and a mouth is selected from the face of the training sample as a face feature.

14. The hierarchical face recognition method for the image under detection according to claim 10, wherein the subdivision condition is determined by a number of generated levels of the sub-image categories.

15. The hierarchical face recognition method for the image under detection according to claim 10, wherein the subdivision condition is determined by a number of the sub-image categories at each level.

* * * * *